March 31, 1964 V. E. LEGG ETAL 3,127,559
MAGNETOMETER ELEMENT HAVING A CENTRALLY
SECURED FERROMAGNETIC CORE
Filed Oct. 15, 1947

Inventors
V. E. Legg
E. R. Morton

By M. O. Hayes
Attorney

United States Patent Office 3,127,559
Patented Mar. 31, 1964

3,127,559
MAGNETOMETER ELEMENT HAVING A CENTRALLY SECURED FERROMAGNETIC CORE
Victor E. Legg, Maplewood, N.J., and Edmund R. Morton, Brooklyn, N.Y., assignors, by mesne assignments, to the United States of America as represented by the Secretary of the Navy
Filed Oct. 15, 1947, Ser. No. 779,910
7 Claims. (Cl. 324—43)

This invention relates generally to magnetometers of the type wherein a ferromagnetic core and cooperating coil of predetermined characteristics are so proportioned and arranged in coaxial spaced relation with respect to each other as to cause the inductance of the coil to be decreased from an initial inductance value by an amount which varies as the square of the intensity of the component of a superimposed magnetic field parallel to the magnetic axis of the magnetometer when the coil is excited by an alternating current of predetermined value corresponding to the initial inductance value. When three such magnetometers are mounted with their magnetic axes arranged in mutually perpendicular spaced relation and with their coils connected in series and excited by an alternating current of predetermined value, the total inductance depression of the magnetometer system upon immersion thereof in an external magnetic field varies as the square of the intensity of the total or scalar value of the field, irrespective of the orientation of the system in the field. The magnetometer system thus provides a total field magnetometer which is inherently squaring in function and eliminates the necessity of external squaring means. A total field magnetometer of this character is disclosed and claimed in the copending application of Thomas B. Brown for Magnetometer, Serial No. 608,811, filed August 3, 1945, now Patent No. 2,853,845.

More specifically, the present invention is directed to a method and structural arrangement for maintaining the ferromagnetic core of a magnetometer element or inductor in predetermined fixed coaxial spaced relation with respect to the cooperating coil therefor in such a manner as to substantially prevent deviations from the quadratic response of the magnetometer when the magnetometer element is subjected to shock or temperature changes encountered in the use thereof.

Total field magnetometers of the aforementioned type have heretofore been employed advantageously as the magnetic field detecting element in the firing circuits of depth charges such, for example, as the depth charge disclosed and claimed in the copending application of Joseph B. Tate, Jr., et al. for Depth Charge Firing Control System, Serial No. 621,155, filed October 8, 1945, now Patent No. 2,880,888.

The total field magnetometers, however, have not been found to be entirely satisfactory in service under all conditions of use thereof, in the absence of the core anchoring method and means hereinafter to be described and claimed, for the reason that the magnetic cores have been found to change position with respect to the cooperating coils individual thereto in response to the shock received as a result of the impact of the depth charge with the surface of the water. Manufacturing tolerances of the magnetometers have permitted spurious or error signals in the order of 3 milligauss resulting from deviations from the true quadratic or parabolic response of the magnetometers such as may be caused, for example, by deviations from the true perpendicularity of the magnetic axes of the cores and mismatching of the magnetometer elements. Small shifts in the relative coaxial positions of the core and the coil mounted thereon have been found to introduce spurious or error signals in response to the magnetometer element which exceed the allowable tolerances.

Previous methods and arrangements heretofore known or used for the purpose of preventing coaxial shifting of the magnetic core with respect to the coil individual thereto have usually been of such a character as to prevent longitudinal expansion or contraction of the core in response to changes in temperature with the result that the core would become strained and its magnetic characteristics altered with the ultimate result of a deviation from the desired quadratic response in excess of the aforementioned tolerances.

According to the method and structural arrangement of the present invention, the core and coil of each of the magnetometer elements of a total field magnetometer are respectively supported within and about a non-magnetic tube, and the core is anchored to the tube substantially at a point therein whereby the core is substantially free to expand or contract longitudinally in response to changes in temperature encountered in the use of the magnetometer while at the same time the core is prevented from shifting axially within the tube, and therefore with respect to the coil wound thereabout and secured thereto, in response to a shock received by the magnetometer or by reason of any other cause or effect tending to produce such shifting movement such, for example, as when the detector is tested in a centrifuge.

The anchoring point is effectuated by forming a suitable opening in the wall of the tube. The core is then inserted into the tube and the portion of the core opposite the opening therein is distorted. Thereafter, the opening is filled with a suitable cement which is not injured by heat and which engages the core to anchor the core to the tube, and finally the entire assembly is heated to anneal the core.

An object of the present invention is to provide a new and improved total field magnetometer having improved quadratic or parabolic response under certain conditions of use thereof.

Another object is to provide a method and structural arrangement for maintaining a magnetometer core and coil in predetermined coaxial spaced relation whereby deviations from the quadratic response of the magnetometer as a result of shock or temperature changes may be substantially prevented.

Another object is to provide a method and structural arrangement for anchoring a magnetic core at a point within the tubular support therefor whereby the core is substantially free to expand and contract longitudinally in response to temperature changes.

Another object is to provide a structural arrangement for anchoring a magnetic core within the supporting tube therefor without introducing strains into the core material which appreciably alter the desired magnetic characteristics of the material.

An additional object is to provide a method and structural arrangement for securing a sensitive magnetic annealed core within a tubular support therefor which will not materially introduce strains therein or interfere with the final annealing process for the core.

Still other objects, features, and advantages of the present invention will become more clearly apparent from the following detailed description of the preferred and certain alternative embodiments of the invention, reference being made to the accompanying drawings wherein.

Figure 3:
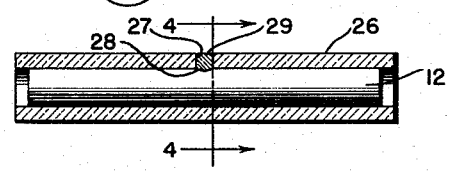
Figure 4:
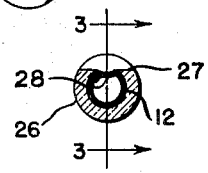
Figure 5:
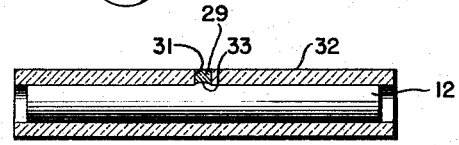
Figure 6:

FIGS. 3 and 4 are central and transverse sectional views respectively of the magnetometer core structure and supporting means therefor in accordance with the preferred embodiment of the invention, FIG. 3 being taken along the line 3—3 of FIG. 4 and FIG. 4 being taken along the line 4—4 of FIG. 3;

FIG. 5 is a view similar to FIG. 3 and illustrates an anchoring arrangement in which the core is distorted outwardly into the opening in the supporting tube in accordance with an alternative embodiment of the invention; and FIG. 6 is a transverse sectional view of a core and a supporting tube therefor in which the opening in the tube is of cylindrical configuration in accordance with another alternative embodiment of the invention.

Figure 1:
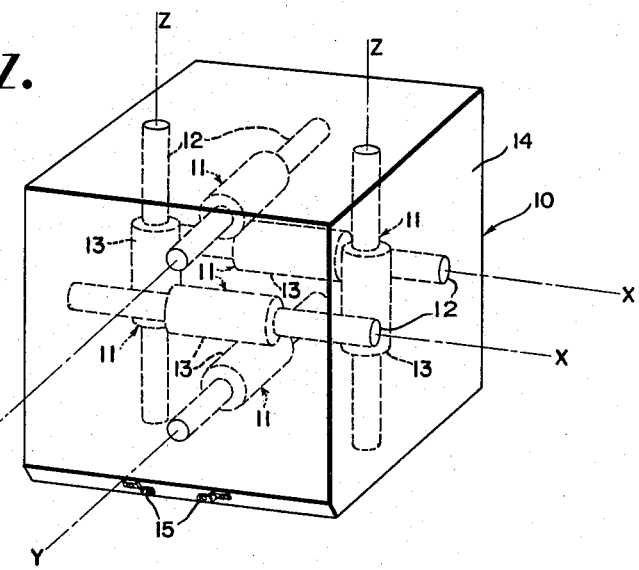
FIG. 1 is a perspective schematic view of a total field magnetometer employing a plurality of magnetometer elements or inductors each employing the structural arrangement for maintaining the core and coil in coaxial spaced relation preferably in accordance with the preferred embodiment of the invention.

Referring now to the drawings for a more complete understanding of the invention, and more particularly to FIG. 1 thereof, there is shown thereon a total field magnetometer detector generally designated by the numeral 10. Detector 10 comprises three pairs of parallel magnetometer elements or inductors, each generally designated 11 and comprising a ferromagnetic core 12 surrounded by a winding or coil 13. The magnetic axes of the three pairs of magnetometer elements 11 are arranged in the mutually perpendicular planes X—X, Y—Y, and Z—Z with their magnetic axes mutually perpendicular, and are maintained in this spaced relation substantially as illustrated in FIG. 1 by being mounted within any suitable non-magnetic support such, for example, as the cube 14 which may be formed of plaster of Paris or any other suitable non-magnetic material. The coils 13 of the magnetometer elements 11 are connected in series and to the pair of terminals 15, FIG. 2. The coils of each of the pairs of magnetometer elements disposed in the aforementioned X, Y and Z planes are wound and connected so as to set up opposing magnetic polarities in the cores 12 individual thereto in order substantially to eliminate the even harmonic current components generated in the coils substantially in the manner disclosed and claimed in the copending application of Everett M. Hafner for Magnetometer, Serial No. 609,307, filed August 6, 1945, now Patent No. 2,924,883.

Figure 2:
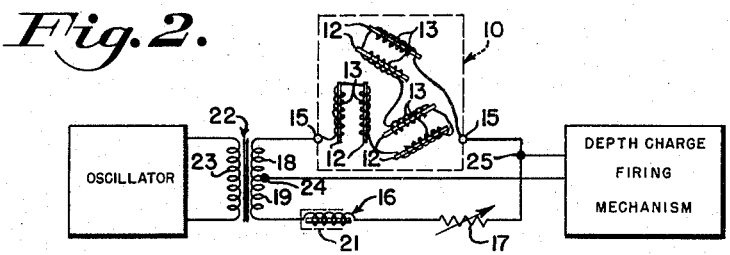
FIG. 2 is a diagrammatic view of a complete electrical system for a depth charge in which the magnetometer of FIG. 1 is included as the detecting element of the system.

Magnetometer 10 is employed in the depth charge firing system of FIG. 2 as the total magnetic field detector element thereof. To this end, detector 10 forms one arm of an alternating current inductance bridge circuit which comprises a balancing inductor 16 and variable resistance 17 as the second arm thereof, and matched secondary transformer windings 18 and 19 which form the third and fourth arms of the bridge circuit. Resistor 17 may be adjusted variably at will to balance the resistance of magnetometer 10. The balancing inductor 16 preferably is designed to have the same initial inductance in the absence of an external field as the magnetometer 10 and is provided with a core of magnetic material having magnetic characteristics which change in the same manner in response to temperature changes as the cores of magnetometer detector 10 and is preferably magnetically shielded as indicated at 21 to render the inductor 16 unresponsive to any external magnetic field. The magnetic shield may, if desired, also constitute or be a part of the electrical shield of the bridge arm.

The exciting current for the bridge circuit may be supplied by any suitable source which includes means for adjusting the strength of the current such, for example, as a continuous-wave Hartley oscillator which conveniently may be coupled to the bridge circuit by means of transformer 22 having a primary winding 23 connected to the oscillator and including the aforesaid secondary windings 18 and 19. The output of the bridge circuit, which appears between points 24 and 25 therein, is connected to the depth charge firing mechanism which includes the additional circuits and apparatus for firing the depth charge under control of the detector 10 as the depth charge moves into proximity with respect to a target vessel. The depth charge firing control system disclosed in FIG. 2 is generally similar to the system disclosed and claimed in the aforementioned copending application of Joseph B. Tate, Jr., et al. for Depth Charge Firing Control System and reference may be had thereto for further details regarding the preferred structural and circuit arrangements and operation of such a system.

Referring now to FIGS. 3 and 4 wherein the structural details of the core and core anchoring structure employed in each of magnetic elements 11 is disclosed in accordance with the preferred embodiment of the invention, it will be seen that the core 12 is in the form of a tube comprising a scroll-wound sheet of any type of ferromagnetic material suitable for the purpose. In practice the ferromagnetic core material is a very thin material in the order of ¾ mil in thickness and is preferably made of a material known in the art as "Permalloy." Such thin material becomes very easily deformed and it is important that it be undistorted or otherwise deformed or strained after being annealed in order to avoid changes in the magnetic characteristics of the material.

In order to protect the core 12, it is preferably inserted into a tube 26 which may be formed of any suitable ceramic material such, for example, as the type commonly used in protecting thermocouples or an aluminum silicate, such as sillimanite.

Core 12 is prevented from moving axially from its centrally disposed position within tube 26 by means of a structural arrangement which secures the core within the tube substantially at a point in a manner presently to be described. A suitable opening is formed in the sidewall of tube 26 as by forming a transverse slot at 27 therein. After inserting core 12 into tube 26, the portion of the core opposite the opening in the tube is slightly deformed inwardly to form a dent 28, after which the slot and dent are filled with a suitable ceramic cement 59 as for example, an aluminum oxide such as Alundum, which is solidified and bonded to the tube 26 by the subsequent application of heat. The entire assembly is heated sufficiently to anneal the core. This structural arrangement thus securely anchors the core in fixed spaced relation within the tube along the axis thereof by means of hardened cement 29 protruding into and frictionally engaging the dent 28 in the core 12, said cement 29 being bonded to or adhering to the walls of the slot 27 in the tube 26.

Alternative core anchoring arrangements are shown in FIGS. 5 and 6 respectively wherein a cylindrical opening 31 is formed in the tube 32 which otherwise may be identical to tube 26, as by drilling or otherwise forming a hole in the sidewall thereof. In FIG. 5 the core 12 is distorted outwardly to form a projection 33 which enters opening 31 into tube 32 and the remaining space in the opening is filled with cement 29, thereby avoiding undesirable concentrated strain areas at the line contact of the projection 33 and the opening 31. In other words any longitudinally or axially displacing force will be reacted to by the friction of the anchorlike engagement between the projection 33 and the cement 29. The cement 29, therefore, contacts the core 12 and by means of friction therebetween prevents undesirable displacement, and also strengthens the tube 26 which is weakened by opening 31. This structural arrangement maintains the sensitive magnetic core 12 in anchored engagement with the tube 26 in a manner such that displacing forces do not set up highly concentrated strained areas. In FIG. 6 the core 12 is deformed inwardly to form a dent 34 at opening 31 and the opening and dent thereafter is filled with cement 29. In either case, the assemblies of FIGS. 5 and 6 thereafter are annealed as in the case of the core assembly of FIGS. 3 and 4.

It will be understood that the coil or winding 13 of each of the magnetometer elements is mounted on and secured to tube 26 or tube 32, as the case may be, in any suitable manner whereby the core 12 and the coil 13 of each of the elements 11 are maintained in fixed coaxial spaced relation.

The point suspension or anchoring of the core within the protecting tube therefor not only serves to prevent shifting of the core within the tube along the axis thereof without appreciably straining the core material but also permits freedom of longitudinal expansion and contraction of the core material whereby straining of the material is substantially avoided in response to any temperature changes which may be encountered in the use of magnetometers employing magnetometer elements of the aforedescribed type.

From the foregoing it should now be apparent that, whereas improvements have been provided in magnetometers of the type considered herein which enhance the serviceability thereof under certain conditions of use, an anchoring arrangement and method have been provided which may be employed to advantage in other forms of magnetic apparatus wherein it is desired to maintain a sensitive magnetic core in spaced relation with respect to a cooperating winding disposed thereabout.

While the invention has been disclosed in particularity with respect to certain examples thereof which give satisfactory results, it will be apparent to those skilled in the art, after understanding the invention and the exacting requirements of a total field magnetometer embodying the invention, that certain other embodiments, modifications and changes may be made without departing from the spirit and scope of the invention as defined by the appended claims.

What is claimed as new and desired to be secured by Letters Patent of the United States is:

1. In a magnetometer element of the character disclosed, the combination of a non-magnetic tube having an opening in the sidewall thereof, a scroll-wound ferromagnetic core disposed within said tube substantially centrally thereof and having a deformed portion disposed adjacent said opening, said tube and said core having different coefficients of linear expansion, and a securing means within said opening and in engagement with said deformed portion of the core to provide locking engagement of the core with the tube thereby to prevent a longitudinal shift of the core within the tube when said element is subjected to shocks, and to permit limited strain-free longitudinal expansion and contraction of the end portions of said core relative to said tube, thereby to prevent alteration of the magnetic characteristics of the core.

2. An anchoring arrangement according to claim 1 wherein the opening in the tube is of cylindrical configuration and extends radially through the tube, and the ferromagnetic core is distorted outwardly thereof to form a projection which coacts with said securing means.

3. In a magnetometer element, according to claim 1, wherein the opening in the tube comprises a transverse slot in the sidewall substantially midway between the ends thereof, and the core comprises an inwardly distorted portion forming a dent in the outer wall thereof disposed adjacent said slot.

4. In a magnetometer element of the character disclosed, the combination of a non-magnetic tube, a scroll-wound ferromagnetic core disposed within said tube, said core and said tube having different coefficients of linear expansion, and mounting means substantially midway the ends of said core and said tube to permit limited strain-free longitudinal expansion and contraction of the end portions of said core relative to said tube in response to temperature changes encountered in the use of said core, thereby to avoid alteration of the magnetic characteristics of the core.

5. In a magnetometer element of the character disclosed, the combination of a non-magnetic tube, a scroll-wound ferromagnetic core disposed within said tube, and mounting means substantially midway the ends of said core and said tube for securing said core against longitudinal and axial shift within said tube when said element is subjected to shocks received by the magnetometer, thereby to avoid alteration of the magnetic characteristics of the core.

6. In a magnetometer, a coil, a ferromagnetic core element disposed within said coil, said core element comprising a nonmagnetic tube, a scroll-wound ferromagnetic core disposed within said tube, said core and said tube having different coefficients of linear expansion, and mounting means substantially midway the ends of said core and said tube to permit limited strain-free longitudinal expansion and contraction of the end portions of said core relative to said tube and said coil in response to temperature changes encountered in the use of said magnetometer, said mounting means also serving to secure said core against longitudinal shift within said tube when said element is subjected to shocks received by the magnetometer, thereby to avoid alteration of the magnetic characteristics of the core.

7. A magnetometer element of the character disclosed comprising, a nonmagnetic tube having an opening in the wall thereof, a ferromagnetic core disposed within said tube and having a deformed portion in alignment with said opening, and a securing means adhering to the walls of said opening and in anchor-like engagement with said deformed portion, thereby to provide freedom of longitudinal expansion and contraction of the end portions of said core in response to temperature changes and to secure said core against axial shift with respect to the tube in response to shocks received by the magnetometer.

References Cited in the file of this patent

UNITED STATES PATENTS

| | | |
|---|---|---|
| 714,903 | Hinds | Dec. 2, 1902 |
| 1,236,145 | Burns | Aug. 7, 1917 |
| 1,572,869 | Adams | Feb. 16, 1926 |
| 1,713,183 | Kindl | May 14, 1929 |
| 1,812,151 | Jacocks | June 30, 1931 |
| 2,251,709 | Klein | Aug. 5, 1941 |
| 2,255,184 | Osenberg | Sept. 9, 1941 |
| 2,300,517 | Milton | Nov. 3, 1942 |
| 2,383,460 | Purves et al. | Aug. 28, 1945 |
| 2,404,016 | Wiegand | July 16, 1946 |
| 2,428,014 | Curry et al. | Sept. 30, 1947 |

OTHER REFERENCES

Article, Air-Borne Magnetometers, pp. 680–681, from magazine, Electrical Engineering, July 1947.